United States Patent
Niwa et al.

(10) Patent No.: US 12,552,365 B2
(45) Date of Patent: Feb. 17, 2026

(54) AUTOMATED PARKING CONTROL DEVICE

(71) Applicant: SUBARU CORPORATION, Tokyo (JP)

(72) Inventors: Hitoshi Niwa, Tokyo (JP); Kentaro Nozu, Tokyo (JP); Koyu Tani, Tokyo (JP); Ryo Noto, Tokyo (JP); Naoki Mizusaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/761,476

(22) Filed: Jul. 2, 2024

(65) Prior Publication Data
US 2025/0018934 A1 Jan. 16, 2025

(30) Foreign Application Priority Data
Jul. 12, 2023 (JP) .................... 2023-114338

(51) Int. Cl.
| | | |
|---|---|---|
| *B60W 30/06* | (2006.01) | |
| *G06T 7/50* | (2017.01) | |
| *G06V 20/56* | (2022.01) | |

(52) U.S. Cl.
CPC .............. *B60W 30/06* (2013.01); *G06T 7/50* (2017.01); *G06V 20/56* (2022.01); *B60W 2420/403* (2013.01); *B60W 2520/28* (2013.01); *B60W 2552/40* (2020.02); *B60W 2554/80* (2020.02); *B60W 2556/35* (2020.02); *G06T 2207/10028* (2013.01); *G06T 2207/20221* (2013.01); *G06T 2207/30252* (2013.01)

(58) Field of Classification Search
CPC ........... B60W 30/06; B60W 2420/403; B60W 2520/28; B60W 2552/40; B60W 2554/80; B60W 2556/35; G06T 7/50; G06T 2207/10028; G06T 2207/20221; G06T 2207/30252; G06T 2207/20021; G06T 2207/30241; G06T 2207/30264; G06T 7/73; G06V 20/56

See application file for complete search history.

(56) References Cited

U.S. PATENT DOCUMENTS 10,106,153 B1 * 10/2018 Xiao ...................... B62D 15/02
2023/0023365 A1    1/2023 Nguyen et al.

FOREIGN PATENT DOCUMENTS

JP    2023-017467 A    2/2023

* cited by examiner

*Primary Examiner* — Daryl C Pope
(74) *Attorney, Agent, or Firm* — Rimon P.C.

(57) ABSTRACT

An automated parking control device includes: a surrounding environment recognition device that acquires surrounding environment information of a vehicle; a parking controller that searches for an available parking area, generate a target route to the available parking area, and control the vehicle to move along the target route; an image processor that estimate a distance to a three-dimensional object and a slippage level of a road surface; an image map generator that generate a road a slippage level map; a wheel selector that predicts routes of vehicle's wheels, superimposes the routes on the map, and selects a wheel expected to pass through a route where the wheel is most unlikely to slip; and a movement amount calculator that acquires a wheel speed pulse of the selected wheel and calculates a movement amount of a reference position of the vehicle.

12 Claims, 5 Drawing Sheets

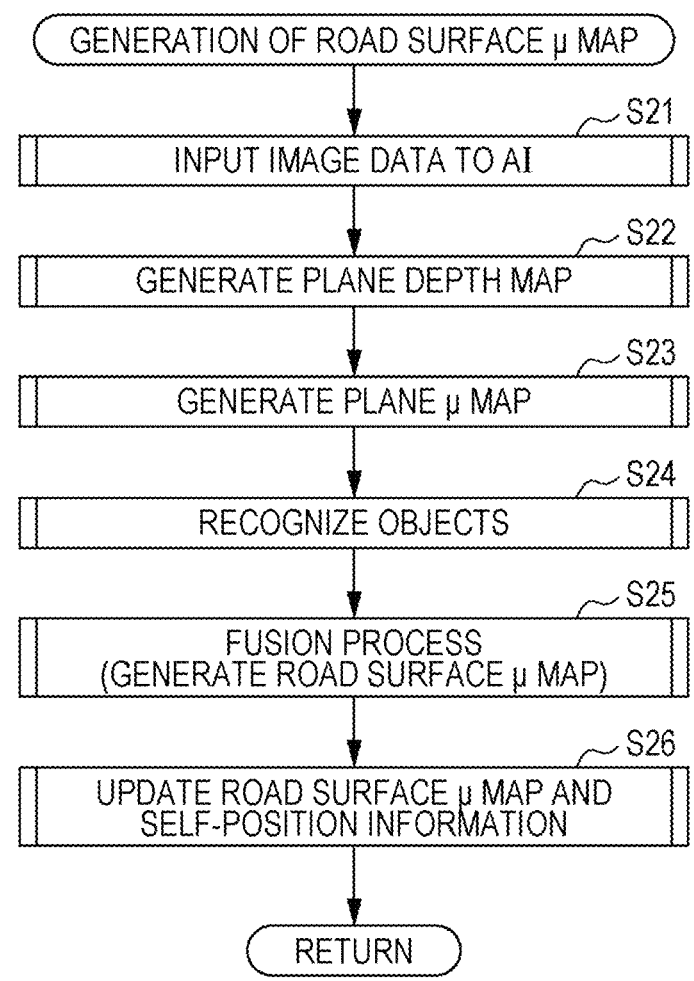

AUTOMATED PARKING CONTROL DEVICE

CROSS-REFERENCE TO RELATED APPLICATIONS

The present application claims priority from Japanese Patent Application No. 2023-114338 filed on Jul. 12, 2023, the entire contents of which are hereby incorporated by reference.

BACKGROUND

The disclosure relates to an automated parking control device that is mounted on a vehicle such as an automobile and executes traveling control for guiding the vehicle to an available parking area, and more particularly, to a technology for executing accurate automated or assisted parking control under a slippery road surface condition.

In the field of vehicles such as automobiles, autonomous driving control technologies have been developed to cause the vehicles to autonomously travel without driving operations of drivers who drive the vehicles. Various traveling control devices using the autonomous driving control technologies have been proposed and put into practical use to execute various types of traveling control for assisting driving operations of drivers.

Examples of related-art traveling control devices include various automated parking control devices including various parking control systems that execute traveling control for guiding vehicles to available parking areas.

Examples of the parking control systems include an assisted parking system (APS) and a partially automated parking system (PAPS).

The related-art automated parking control devices execute automated or assisted parking control (hereinafter referred to as "automated parking control etc.") including the following control process. Various sensors are used to acquire surrounding environment information of a vehicle (e.g., lane lines on a road surface and three-dimensional structures such as wheel stoppers). Search is made for an available parking area based on the acquired surrounding environment information. A target route for movement of the vehicle is generated while the available parking area found by the search is set as a destination. Various type of control (steering, driving, braking, etc.) are executed as appropriate to move the vehicle along the generated target route.

For example, Japanese Unexamined Patent Application Publication No. 2023-017467 proposes an automated parking control device that executes such automated parking control etc.

During the automated parking control etc., the vehicle is accurately controlled to move along the generated target route. Therefore, the movement amount of the vehicle is accurately predicted when calculating control values in feedback control and feedforward control for steering, driving, braking, etc.

Examples of related-art methods for predicting the movement amount of the vehicle include a so-called global positioning system (GPS) method in which the movement distance is calculated based on a vehicle position by using a global navigation satellite system (GNSS) sensor, and a wheel speed pulse method in which the movement distance is integrated based on wheel speed pulses.

In the GPS method, radio wave reception from satellites may become unstable or difficult in, for example, a multi-storey parking space or a roofed garage. Therefore, the GPS method may be inappropriate to predict the movement amount of the vehicle during the automated parking control etc.

The wheel speed pulse method is generally used to predict the movement amount of the vehicle during the automated parking control etc.

SUMMARY

An aspect of the disclosure provides an automated parking control device configured to execute traveling control for guiding a vehicle to an available parking area. The automated parking control device includes a surrounding environment recognition device, a parking controller, an image processor, an image map generator, a wheel selector, and a movement amount calculator. The surrounding environment recognition device is configured to acquire surrounding environment information of the vehicle. The parking controller is configured to search for the available parking area based on the surrounding environment information acquired by the surrounding environment recognition device, generate a target route for movement of the vehicle while the available parking area found by search is set as a destination, and execute traveling control for moving the vehicle along the generated target route. The image processor is configured to estimate a distance to a recognized three-dimensional object and a slippage level of a road surface based on the surrounding environment information acquired by the surrounding environment recognition device. The image map generator is configured to generate a road surface $\mu$ map indicating the slippage level of the road surface by image synthesis of information on the distance estimated by the image processor, information on the slippage level of the road surface estimated by the image processor, and the surrounding environment information. The wheel selector is configured to predict passing routes of wheels of the vehicle based on the target route, superimpose the predicted routes of the wheels on the road surface $\mu$ map, and select, from among the wheels, one wheel expected to pass through a route where the wheel is most unlikely to slip. The movement amount calculator is configured to acquire a wheel speed pulse of the selected wheel and calculate a movement amount of a reference position of the vehicle.

An aspect of the disclosure provides an automated parking control device configured to execute traveling control for guiding a vehicle to an available parking area. The automated parking control device includes circuitry. The circuitry is configured to acquire surrounding environment information of the vehicle. The circuitry is configured to search for the available parking area based on the acquired surrounding environment information, generate a target route for movement of the vehicle while the available parking area found by search is set as a destination, and execute traveling control for moving the vehicle along the generated target route. The circuitry is configured to estimate a distance to a recognized three-dimensional object and a slippage level of a road surface based on the acquired surrounding environment information. The circuitry is configured to generate a road surface $\mu$ map indicating the slippage level of the road surface by image synthesis of information on the estimated distance, information on the estimated slippage level of the road surface, and the surrounding environment information. The circuitry is configured to predict passing routes of wheels of the vehicle based on the target route, superimpose the predicted routes of the wheels on the road surface $\mu$ map, and select, from among the wheels, one wheel expected to pass through a route where the wheel is most unlikely to slip. The circuitry is configured to acquire a wheel speed pulse of the selected wheel and calculate a movement amount of a reference position of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 7 is a flowchart illustrating a subroutine of a road surface μ map generation process of FIG. 6 (process of Step S4 of FIG. 6).

DETAILED DESCRIPTION

In prediction of the movement amount of a vehicle using a wheel speed pulse method, wheels may slip under a surrounding road surface condition in which the wheels are likely to slip, such as a snowy road. The slip of the wheels may cause a deviation in the predicted movement amount of the vehicle calculated based on wheel speed pulses.

In this case, the timings to control steering, driving, braking, etc. based on the calculated predicted movement amount may become inaccurate. A problem may arise in terms of a decrease in the performance to follow a target route of the vehicle in automated parking control etc.

If the performance to follow the target route decreases, the stop position of the vehicle on a target available parking area may deviate or the number of turning operations etc. may increase. Thus, a problem may arise in terms of a decrease in the quality of vehicle control.

It is desirable to provide an automated parking control device that can execute accurate automated or assisted parking control under a slippery road surface condition such as a snowy road. This automated parking control device is mounted on a vehicle such as an automobile and executes traveling control for guiding the vehicle to an available parking area.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
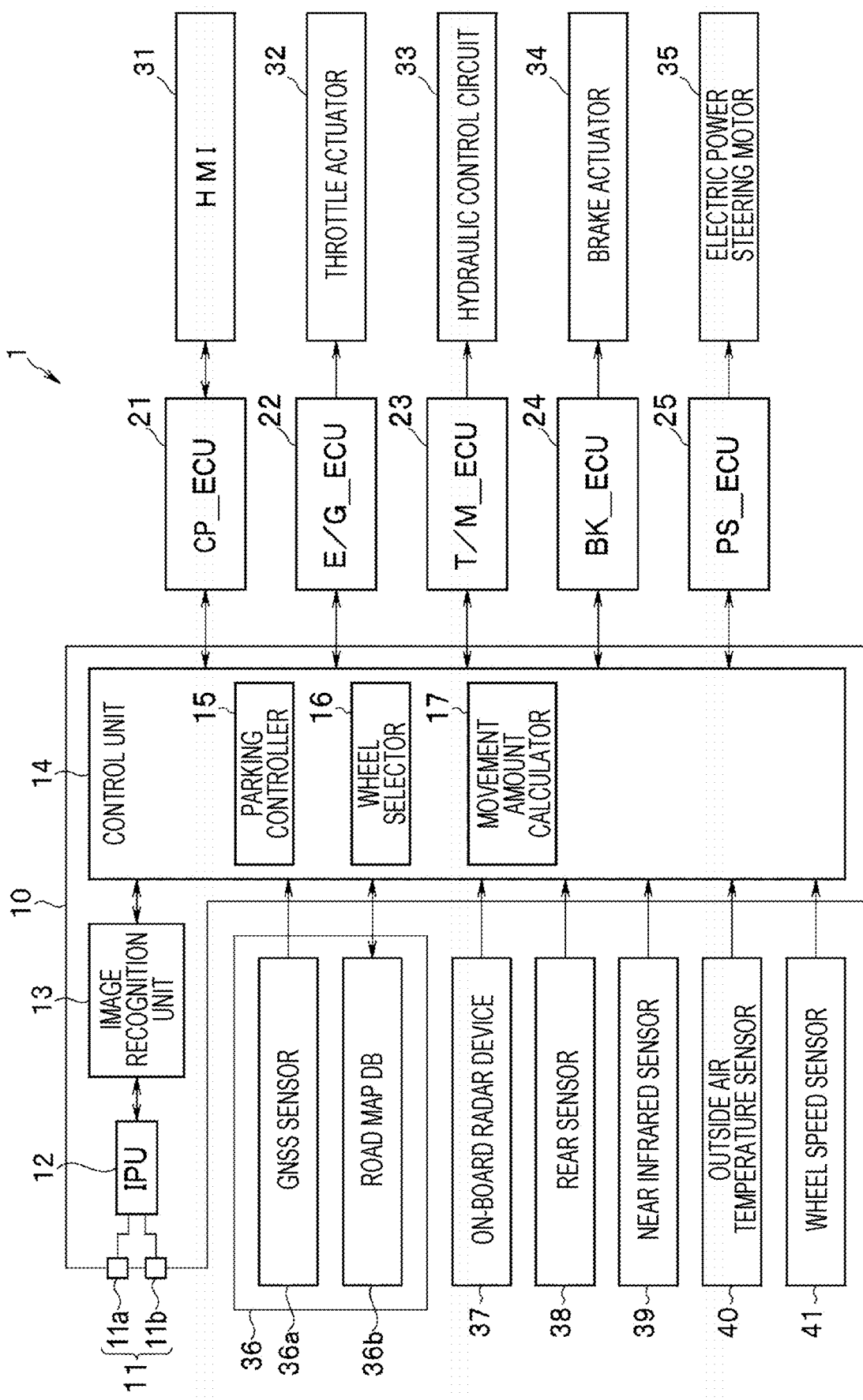
FIG. 1 is a block diagram illustrating a schematic configuration of a traveling control device for a vehicle that includes an automated parking control device according to an embodiment of the disclosure.

A schematic configuration of a traveling control device for a vehicle that includes an automated parking control device according to the embodiment of the disclosure is described below with reference to FIG. 1. FIG. 1 is a block diagram illustrating the schematic configuration of the traveling control device for the vehicle that includes the automated parking control device according to the embodiment of the disclosure.

The traveling control device illustrated in FIG. 1 basically has a configuration substantially similar to those of related-art traveling control devices of the same type. In the following description, illustration of the general configuration of the traveling control device and detailed description thereof are omitted. Components of the automated parking control device of this embodiment are described below.

The traveling control device for the vehicle that includes an automated parking control device 1 of this embodiment includes a camera unit 10 that is an on-board camera device fixed to an upper central part of a front area in a cabin of a vehicle including the traveling control device (hereinafter referred to as "vehicle" (not illustrated)).

The camera unit 10 includes a stereo camera 11, an image processing unit (IPU) 12, an image recognition unit 13, and a control unit 14.

The stereo camera 11 includes two cameras that are a main camera 11a and a subcamera 11b. For example, the main camera 11a and the subcamera 11b are disposed in the cabin of the vehicle at bilaterally symmetrical positions across the center in a vehicle width direction to face a forward side (in a traveling direction). For example, the main camera 11a and the subcamera 11b each include an imaging optical system, an imaging element such as a CMOS image sensor, and a processing circuit that processes an imaging signal etc.

The main camera 11a and the subcamera 11b of the stereo camera 11 acquire two pieces of image data on a surrounding environment in an external forward area within a predetermined range from two different viewpoints in every predetermined synchronous imaging period. The stereo camera 11 generates stereoscopic image data based on the acquired two pieces of image data. The stereoscopic image data is surrounding environment information indicating the surrounding environment around the traveling vehicle. The surrounding environment information (image data) generated by the stereo camera 11 is output to the image processing unit 12.

The image processing unit 12 is a constituent unit or a circuit unit that executes predetermined image processing for the surrounding environment information acquired by the stereo camera 11 (image data indicating the surrounding environment around the traveling vehicle). For example, the image processing unit 12 executes a process of detecting edges of various targets (objects, lane lines, etc.) indicated in the image.

The image processing unit 12 acquires distance information based on positional deviation amounts of corresponding edges in the right and left images in the stereoscopic image data, and generates image information including the distance information (distance image information). The distance image information etc. generated by the image processing unit 12 is output to the image recognition unit 13.

The image recognition unit 13 calculates, based on the distance image information etc. input from the image processing unit 12, a road curvature [1/m] between right and left lane lines of a road where the vehicle is traveling (vehicle traveling road), a width between the right and left lane lines (lane width), etc. Various known methods are used to obtain the road curvature and the lane width.

The image recognition unit 13 executes predetermined pattern matching etc. based on the distance image information acquired by the stereo camera 11 to recognize three-dimensional objects along a road (e.g., guardrails, curbstones, and surrounding other vehicles), parking slot lines on a road surface in a parking space, three-dimensional structures such as wheel stoppers in parking slots, or spaces from adjacent other vehicles. The image recognition unit 13 also recognizes a condition of a road surface around the vehicle, etc. (hereinafter referred to as "road surface condition etc.").

In the recognition of three-dimensional objects (object recognition), the image recognition unit 13 recognizes, for example, types of the three-dimensional objects, heights of the three-dimensional objects, widths of the three-dimensional objects, distances from the vehicle to the three-dimensional objects, movement speeds of the three-dimensional objects, relative speeds between the three-dimensional objects and the vehicle, and relative distances between the three-dimensional objects (e.g., a lateral distance between a roadside curbstone and a lane line nearby).

Examples of the road surface condition etc. recognized by the image recognition unit 13 include a condition in which the road surface is wet by rain or snowmelt, a rainfall condition, a snow covering condition, a compacted snow condition, and a road surface freezing condition. For example, the road surface condition etc. is estimated based on a brightness difference in the image.

Various types of information recognized by the image recognition unit 13 are output to the control unit 14 as surrounding environment information. In one embodiment, the camera unit 10 including the image recognition unit 13 may serve as a surrounding environment recognition device configured to recognize a surrounding environment around the vehicle.

Figure 2:
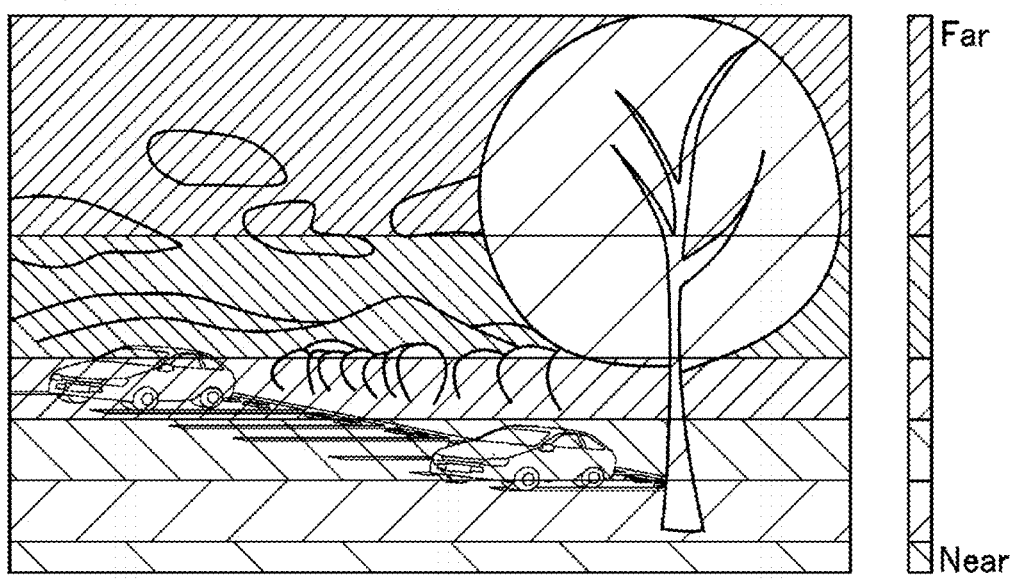
FIG. 2 illustrates a display example of a plane depth map generated by the automated parking control device of the embodiment.

The image recognition unit 13 analyzes the image by artificial intelligence (AI) using, for example, a semantic segmentation technology based on the surrounding environment information (image data) acquired by the stereo camera 11. The AI executes depth estimation (distance estimation) for three-dimensional objects recognized based on the input image data, and generates a plane (2D) depth map indicating depth distribution in a plane image. FIG. 2 illustrates a display example of the generated plane depth map.

As illustrated in FIG. 2, the plane depth map ("Depth-MAP" in FIG. 2) is image data obtained by superimposing depth distribution information (depth information) on a normal image. In the display example of FIG. 2, the depth (distance), that is, far or near, is represented by types of hatching. A measure of the depth (far or near) in the image is provided outside the image field in FIG. 2.

Figure 3:
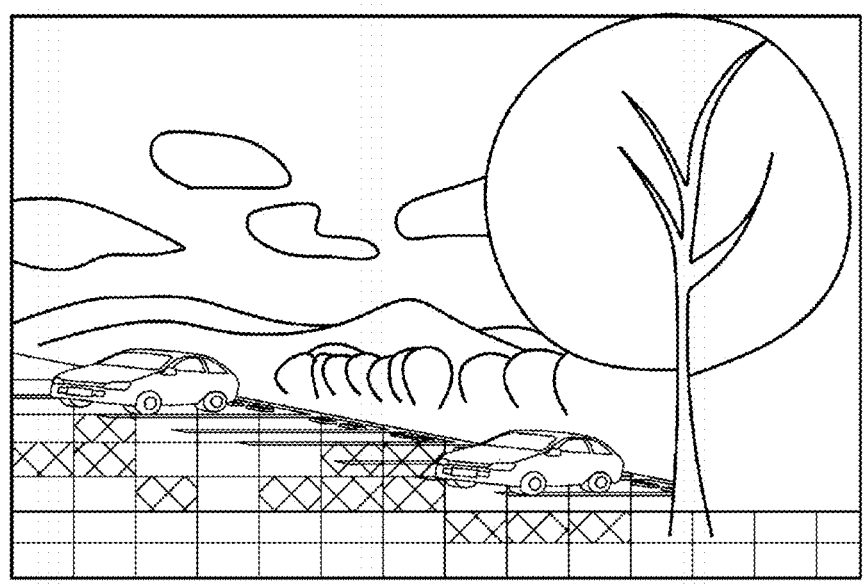
FIG. 3 illustrates a display example of a plane u map generated by the automated parking control device of the embodiment.

The AI estimates the road surface condition etc. based on the input image data (road surface μ estimation). The AI generates a plane (2D) μ map in which areas indicating slippage levels (mu (μ); coefficient of friction) are displayed on the road surface. FIG. 3 illustrates a display example of the generated plane u map.

As illustrated in FIG. 3, the plane μ map ("μ-MAP" in FIG. 3) is image data obtained by superimposing road surface slippage level information (μ information) on an area corresponding to the road surface in a normal image. In the display example of FIG. 3, slippery areas are hatched. Information "Low_μ" outside the image field in FIG. 3 indicates that the hatched areas are low-μ areas. Although the slippage levels are not clearly displayed in the display example of FIG. 3, the slippage levels can be displayed by, for example, varying the types of indication (hatching) of the slippery areas.

The image recognition unit 13 generates a road surface μ map (FIG. 4) in a predetermined format by fusing the plane depth map (FIG. 2), the plane μ map (FIG. 3), and the object recognition data (image data). In one embodiment, the image recognition unit 13 may serve as an image map generator.

Figure 4:
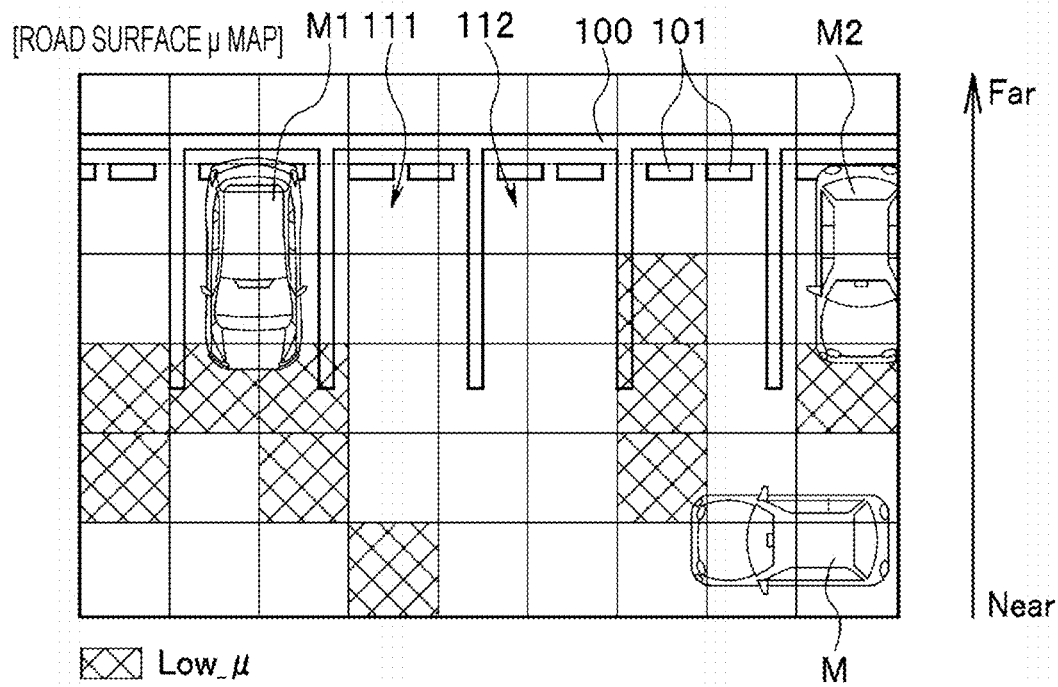
FIG. 4 illustrates a display example of a road surface u map generated by the automated parking control device of the embodiment.

FIG. 4 illustrates a display example of the road surface μ map generated by the image recognition unit 13. The road surface μ map is image data including the depth information (distance information) and the road surface slippage level information (u information).

The display example of the road surface μ map of FIG. 4 is a bird's eye view of an area near a target parking position, including the vehicle. Reference symbol M in FIG. 4 represents the vehicle. Reference symbols M1 and M2 in FIG. 4 represent other vehicles. In FIG. 4, the other vehicles M1 and M2 are parked in predetermined parking slots. Reference symbol 100 in FIG. 4 represents a parking slot line. Reference symbol 101 in FIG. 4 represents a wheel stopper in a parking slot.

Reference symbols 111 and 112 in FIG. 4 represent available parking areas. In FIG. 4, reference symbol 111 represents a first candidate parking area, and reference symbol 112 represents a second candidate parking area. In the example of FIG. 4, two available parking areas out of multiple available parking areas are recognized as candidate parking areas.

The control unit 14 is a constituent unit or a circuit unit that is included in the camera unit 10, controls the camera unit 10, and centrally controls the overall traveling control device including the automated parking control device 1 of this embodiment.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the control unit 14 via an internal communication network such as a controller area network (CAN).

A human-machine interface (HMI) 31 disposed near a driver's seat is coupled to the CP_ECU 21. For example, the HMI 31 includes a switch for giving instructions to execute various types of drive assist control, a mode selection switch for switching driving modes, a steering touch sensor that detects a steering wheel holding state of a driver, a driver monitoring system (DMS) that executes facial authentication of the driver and detects a line of sight, an internal monitoring system that includes an internal camera and recognizes occupants including the driver in the vehicle, a touch panel display (visual indicator), a combination of meters, and a sound output device including a loudspeaker (audio indicator).

In response to a control signal from the control unit 14, the CP_ECU 21 notifies the driver as appropriate by display and sound through the HMI 31 about various types of information related to, for example, various alerts for a preceding vehicle, the status of the drive assist control, and the surrounding environment around the vehicle. The CP_ECU 21 outputs, to the control unit 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 is a driving device that controls drive of the throttle actuator 32 based on, for example, a control signal from the control unit 14 or detection signals from various sensors to generate a driving force of the vehicle. The E/G_ECU 22 adjusts the intake amount of an engine to generate desired engine power. The E/G_ECU 22 outputs, to the control unit 14, signals of an accelerator operation amount etc. detected by various sensors.

A hydraulic control circuit 33 is coupled to an output side of the T/M_ECU 23. Various sensors such as a shift position sensor (not illustrated) are coupled to an input side of the T/M_ECU 23.

The T/M_ECU 23 executes hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the control unit 14, signals of a shift position etc. detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 is a braking device that controls drive of the brake actuator 34 based on a control signal from the control unit 14 or detection signals from various sensors to control braking of the vehicle. The BK_ECU 24 generates, for the wheels as appropriate, braking forces for forcible braking control and yaw rate control on the vehicle. The BK_ECU 24 outputs, to the control unit 14, signals of a brake operation status, a yaw rate, a longitudinal acceleration, a vehicle speed, etc. detected by various sensors.

An electric power steering motor 35 for applying a steering torque of a rotational force from a motor to a steering mechanism is coupled to an output side of the PS_ECU 25. Various sensors such as a steering torque sensor and a steering angle sensor (not illustrated) are coupled to an input side of the PS_ECU 25.

The PS_ECU 25 is a steering device that controls drive of the electric power steering motor 35 based on a control signal from the control unit 14 or detection signals from various sensors to control steering of the vehicle. The PS_ECU 25 causes the motor 35 to generate the steering torque for the steering mechanism. The PS_ECU 25 outputs, to the control unit 14, signals of a steering torque, a steering angle, etc. detected by various sensors.

Various sensors such as a locator unit 36, an on-board radar device 37, a rear sensor 38, a near infrared sensor 39, an outside air temperature sensor 40, and a wheel speed sensor 41 are coupled to the control unit 14.

The locator unit 36 includes a GNSS sensor 36a and a high-accuracy road map database (road map DB) 36b.

The GNSS sensor 36a measures the position (latitude, longitude, and altitude) of the vehicle by receiving positioning signals from positioning satellites.

The road map DB 36b is a large-capacity storage medium such as a hard disk drive (HDD) or a solid state drive (SSD), and stores high-accuracy three-dimensional road map information (dynamic map).

For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB 36b includes dynamic information that changes incessantly, such as traffic regulations, roadworks, traffic accidents, and traffic congestion.

The locator unit 36 can acquire, by communicating with external systems (not illustrated), real-time information on a surrounding environment at the vehicle position measured by the GNSS sensor 36a (e.g., traffic congestion information, weather information, and various types of information on parking spaces)). Examples of the weather information include fog information, rainfall information, snowfall information, snow coverage information, and temperature and humidity information in a region including the vehicle position.

The road map DB 36b stores information on various facilities and parking spaces. Based on, for example, a request signal from the control unit 14, the road map DB 36b outputs road map information in a set range around the vehicle position measured by the GNSS sensor 36a to the control unit 14 as surrounding environment information. In one embodiment, the road map DB 36b may serve as the surrounding environment recognition device configured to recognize the surrounding environment around the vehicle in cooperation with the GNSS sensor 36a.

The on-board radar device 37 includes sensors such as millimeter wave radars. The millimeter wave radars detect three-dimensional objects such as pedestrians and vehicles traveling side by side and structures (three-dimensional objects such as a curbstone, a guardrail, a wall of a building, and a plant) along a roadside (e.g., an end at a road shoulder) by outputting radio waves and analyzing the reflected radio waves from the objects. The millimeter wave radars also detect three-dimensional obstacles on a road. For example, the millimeter wave radars each detect a width of the three-dimensional object, a position of a representative point of the three-dimensional object (position and distance relative to the vehicle), and a relative speed as specific information related to the three-dimensional object.

For example, the sensors (millimeter wave radars) in the on-board radar device 37 are disposed on right and left sides of a front bumper (referred to as "right and left front side sensors") and on right and left sides of a rear bumper (referred to as "right and left rear side sensors"). The right and left front side sensors detect, as surrounding environment information, three-dimensional objects in right and left obliquely forward and side areas around the vehicle. Those areas are difficult to recognize from an image captured by the stereo camera 11. The right and left rear side sensors detect, as surrounding environment information, three-dimensional objects in right and left obliquely rearward and side areas around the vehicle. Those areas are difficult to recognize by the right and left front side sensors.

In one embodiment, the on-board radar device 37 may serve as the surrounding environment recognition device configured to recognize the surrounding environment around the vehicle. The pieces of information acquired by the sensors of the on-board radar device 37 are sent to the image recognition unit 13 through the control unit 14.

Examples of the rear sensor 38 include a sonar device that measures the distance to a target and the shape of the target by using ultrasonic waves. For example, at least one rear sensor 38 (or multiple rear sensors) is disposed on the rear bumper. The rear sensor 38 detects three-dimensional objects in a rearward area behind the vehicle as surrounding environment information. This area is difficult to recognize by the right and left rear side sensors. In one embodiment, the rear sensor 38 may serve as the surrounding environment recognition device configured to recognize the surrounding environment around the vehicle.

Coordinates of the external targets in the surrounding environment information recognized by the image recognition unit 13, the surrounding environment information recognized by the locator unit 36, the surrounding environment information recognized by the on-board radar device 37, and the surrounding environment information recognized by the rear sensor 38 are converted by the control unit 14 into coordinates in a three-dimensional coordinate system having its origin at the center of the vehicle.

The near infrared sensor 39 recognizes a surrounding condition around the vehicle, in particular, a road surface condition such as a road surface temperature. The road surface temperature, the amount of water on the road surface, a snow covering condition on the road surface, etc. is recognized based on information acquired by the near infrared sensor 39. The outside air temperature sensor 40 detects a change in the outside air temperature around the vehicle.

The pieces of information acquired by the sensors such as the near infrared sensor 39 and the outside air temperature sensor 40 are detected as surrounding environment information. In one embodiment, the sensors such as the near infrared sensor 39 and the outside air temperature sensor 40 may serve as the surrounding environment recognition device configured to recognize the surrounding environment around the vehicle.

The wheel speed sensor 41 detects wheel rotation speeds by detecting pulse signals (wheel speed pulses) generated in proportion to the numbers of revolutions of the wheels (generally four wheels) of the vehicle.

The control unit 14 executes traveling control on the vehicle based on the pieces of information acquired by various sensors. The traveling control is any appropriate traveling control on the vehicle, such as engine power control by the E/G_ECU 22, torque distribution control on driving wheels, traveling direction control for determining forward or reverse movement through control on the transmission by the T/M_ECU 23, and braking control on the individual wheels by the BK_ECU 24 (brake control).

Various sensors for acquiring surrounding environment information may include, in addition to the sensors described above, a light detection and ranging (LiDAR) device that measures the distance to a target and the shape of the target by using laser light.

The stereo camera 11 observes a predetermined forward field of view. In addition, camera devices of the same type may be provided to observe predetermined lateral and rearward fields of view. Thus, all the ranges around the vehicle can be observed.

The control unit 14 includes a parking controller 15, a wheel selector 16, and a movement amount calculator 17.

The parking controller 15 is a constituent unit or a circuit unit that executes various processes when executing automated parking control based on pieces of information acquired by various sensors. Examples of various processes to be executed when executing the automated parking control include a process of searching for a target parking position (i.e., an available parking area), a process of generating a target parking route for guiding the vehicle to the parking position found by the search, and a process of calculating vehicle control values (control values for steering control, driving control, braking control, etc.) for movement of the vehicle along the generated target parking route.

The wheel selector 16 is a constituent unit or a circuit unit that executes a process of selecting wheel position information having highest reliability. The wheel selector 16 calculates predicted routes of the wheels (generally four wheels) based on the target parking route generated by the parking controller 15 and specification information of the vehicle (e.g., a tread value and a wheelbase value) prestored in a predetermined memory etc. (not illustrated). The wheel selector 16 executes arithmetic processing for superimposing the calculated predicted routes of the wheels on the road surface μ map (see FIG. 5). The wheel selector 16 selects the predicted route of a wheel expected to pass through an area where the wheel is most unlikely to slip (high-u area) from among the predicted routes of the wheels.

Figure 5:
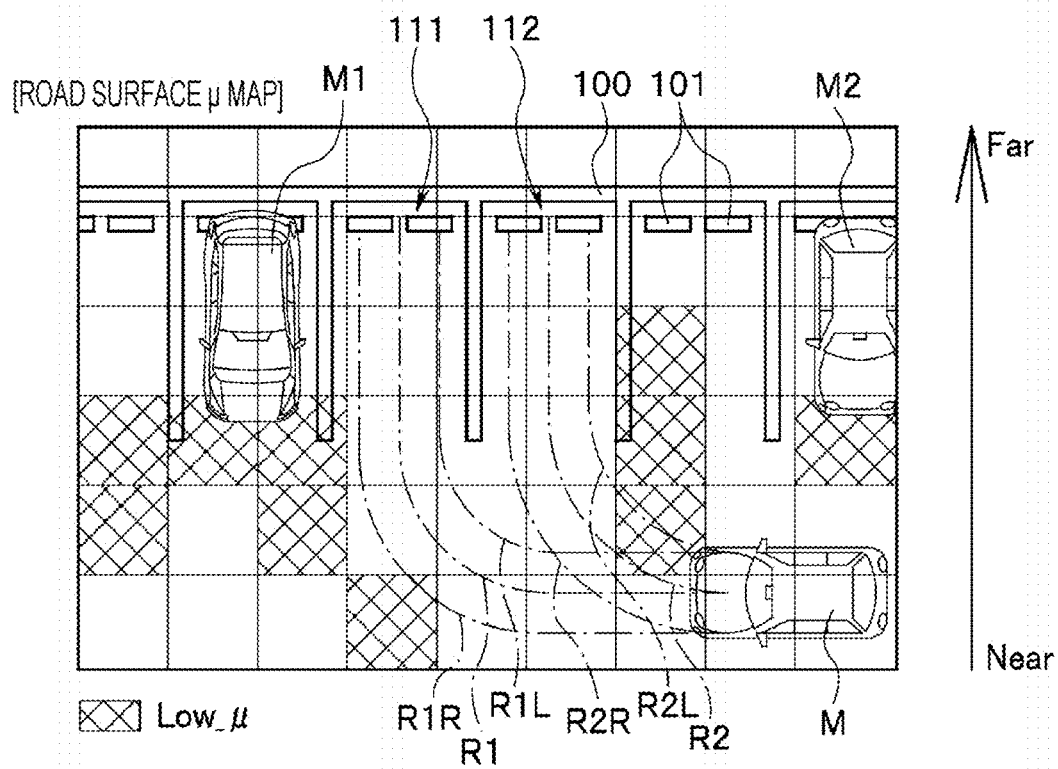
FIG. 5 illustrates a display example in which target routes and predicted wheel routes are superimposed on the road surface μ map of FIG. 4.

FIG. 5 illustrates a display example in which target parking routes and predicted routes of the wheels are superimposed on the road surface μ map of FIG. 4. Reference symbol R1 in FIG. 5 represents a first target parking route to the first candidate parking area 111 of the vehicle M. Reference symbols R1R and R1L in FIG. 5 represent predicted wheel routes of the wheels of the vehicle M associated with the first target parking route R1. Reference symbol R1R represents a predicted wheel route of the right wheel, and reference symbol R1L represents a predicted wheel route of the left wheel.

Reference symbol R2 in FIG. 5 represents a second target route to the second candidate parking area 112 of the vehicle M. Reference symbols R2R and R2L in FIG. 5 represent predicted wheel routes of the wheels of the vehicle M associated with the second target parking route R2. Reference symbol R2R represents a predicted wheel route of the right wheel, and reference symbol R2L represents a predicted wheel route of the left wheel.

For example, the predicted wheel routes are provided for the four wheels (front and rear right and left wheels). In the display example of FIG. 5, two predicted routes of the right and left wheels are illustrated instead of displaying all the predicted routes to avoid complication of the figure. This display example is not limitative, and the predicted routes of all the wheels may be displayed.

The movement amount calculator 17 is a constituent unit or a circuit unit that executes a process of calculating an estimated movement amount of the vehicle. The movement amount calculator 17 acquires wheel speed pulses of the wheels by receiving an output from the wheel speed sensor 41, and calculates a movement amount (movement distance) of a reference position of the vehicle (e.g., a central position of the vehicle or a central position of rear axles of the vehicle) based on the rotation amounts of the wheels. The movement amount calculator 17 executes a vehicle position estimation process (odometry process) for estimating a self-position by estimating a traveling trajectory based on the calculated integrated movement distance.

All or part of the image recognition unit 13, the control unit 14, the parking controller 15, the wheel selector 16, the movement amount calculator 17, the CP_ECU 21, the E/G_ECU 22, the T/M_ECU 23, the BK_ECU 24, the PS_ECU 25, and the locator unit 36 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM etc. and executes the software programs by loading the software programs in the RAM. The software programs implement the functions of the components and the constituent units (13 to 17, 21 to 25, 36) by referring to various types of data as appropriate.

The processor may be implemented by a semiconductor chip such as a field programmable gate array (FPGA). The components and the constituent units (13 to 17, 21 to 25, 36) may be implemented by electronic circuits.

The software programs may entirely or partially be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

Figure 6:
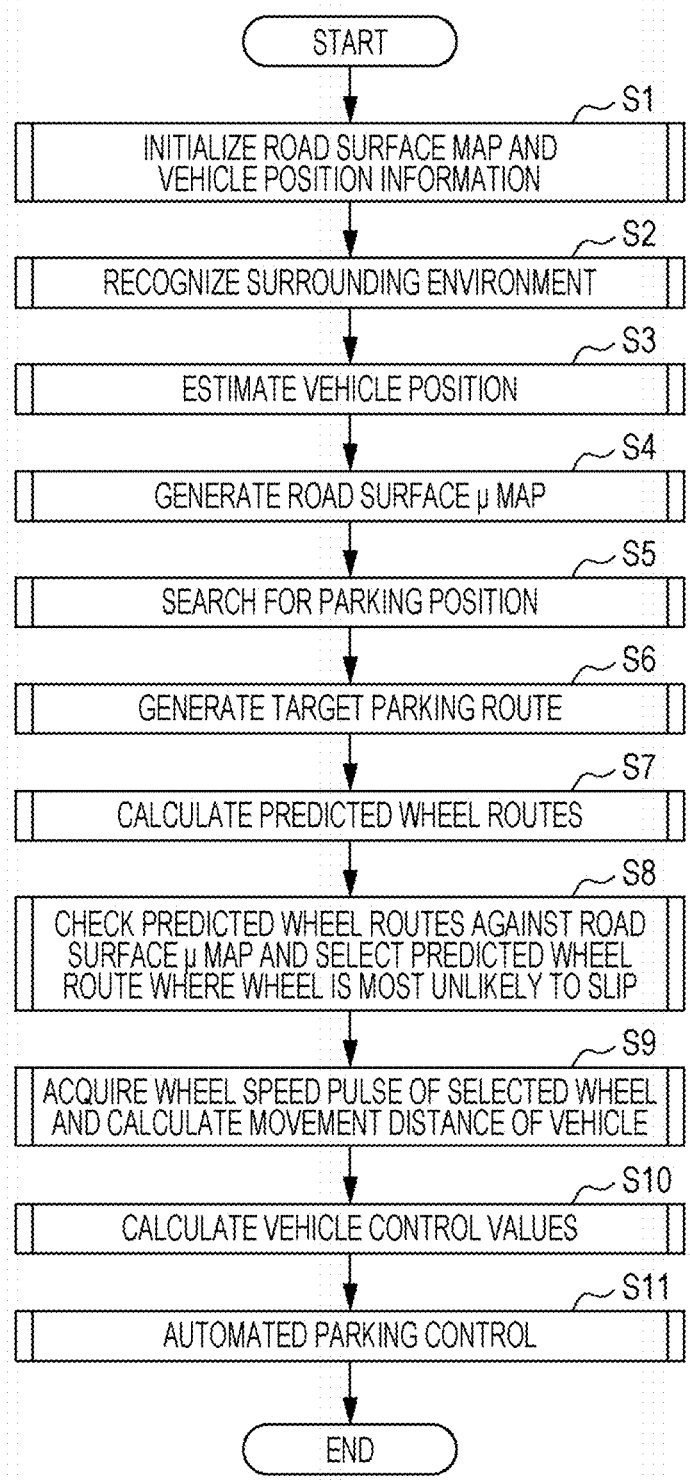
FIG. 6 is a flowchart illustrating operations of the traveling control device for the vehicle that includes the automated parking control device of the embodiment.

Operations of the automated parking control device 1 of this embodiment are described below with reference to FIGS. 6 and 7. FIG. 6 is a flowchart illustrating operations of the traveling control device for the vehicle that includes the automated parking control device of this embodiment. FIG. 7 is a flowchart illustrating a subroutine of a road surface μ map generation process in the flowchart of FIG. 6 (process of Step S4 of FIG. 6). In FIGS. 6 and 7, an automated parking control process is described.

When the traveling control device for the vehicle M is activated and the automated parking control process by the automated parking control device 1 is started, the control unit 14 executes a process of initializing road surface u map information and vehicle position information in Step S1 of FIG. 6. The initialization process is a general process for initializing the memory by deleting information during previous traveling from the memory.

In Step S2, the control unit 14 executes a surrounding environment recognition process based on surrounding environment information acquired by various sensors such as the camera unit 10, the locator unit 36, and the on-board radar device 37. The surrounding environment recognition process is a general process executed by the traveling control device. The surrounding environment recognition process is continued while the vehicle M is traveling.

In Step S3, the control unit 14 controls the movement amount calculator 17 to execute a vehicle position estimation process. For example, the vehicle position estimation process is a process of detecting output signals from the wheel speed sensor 41, the steering angle sensor (not illustrated), etc., estimating a movement amount from an initial position of the vehicle M, and calculating a current estimated position (odometry process). The vehicle position estimation process is continued while the vehicle M is traveling.

In Step S4, the control unit 14 controls the image recognition unit 13 to execute the road surface μ map generation process. The road surface μ map generation process is described below with reference to FIG. 7.

In Step S21 of FIG. 7, the control unit 14 inputs, to the AI in the image recognition unit 13, image data acquired by the stereo camera 11 and subjected to a predetermined process by the image processing unit 12.

In Step S22, the control unit 14 controls the image recognition unit 13 to execute a plane depth map generation process. The plane depth map generation process is a process of generating the plane depth map (see FIG. 2) by executing depth estimation (distance estimation) through image analysis of the image data input to the AI.

In Step S23, the control unit 14 controls the image recognition unit 13 to execute a plane μ map generation process. The plane μ map generation process is a process of generating the plane μ map (see FIG. 3) by executing estimation of a road surface condition etc. (road surface u estimation) through image analysis of the image data input to the AI.

In Step S24, the control unit 14 controls the image recognition unit 13 to execute an object recognition process through image analysis of the input image data.

In Step S25, the control unit 14 controls the image recognition unit 13 to execute a fusion process. The fusion process is a process of generating the road surface μ map in the predetermined format (see FIG. 4) by fusing the generated plane depth map, the generated plane μ map, and the object recognition data.

In Step S26, the control unit 14 controls the image recognition unit 13 to update the generated road surface μ map and the self-position information. Then, the process returns to the initial step (RETURN).

In Step S5 of FIG. 6, the control unit 14 controls the parking controller 15 to execute a parking position search process based on the surrounding environment information acquired by various sensors such as the camera unit 10, the locator unit 36, and the on-board radar device 37. The parking position search process is a process of searching for a target parking position (available parking area) of the vehicle M based on a result of recognition of objects such as parking slots and other vehicles.

In Step S6, the control unit 14 controls the parking controller 15 to generate a target parking route linking the vehicle position and the parking position based on the current estimated position information of the vehicle M acquired in the process of Step S3 and the target parking position information acquired in the process of Step S5 (target parking route generation process).

In Step S7, the control unit 14 controls the wheel selector 16 to calculate predicted routes of the four wheels based on the target parking route information acquired in the process of Step S6 and the specification information of the vehicle M (predicted wheel route calculation process).

In Step S8, the control unit 14 controls the wheel selector 16 to execute a wheel selection process for checking the predicted wheel routes acquired in the process of Step S7 against the road surface μ map acquired in the process of Step S4 and selecting a wheel expected to pass through a route where the wheel is most unlikely to slip from among the four wheels.

For example, the wheel expected to pass through the route where the wheel is most unlikely to slip is selected by comparing overall values of all the routes of each wheel and selecting one wheel expected to pass through the route where the wheel is most unlikely to slip. For example, a wheel expected to pass through an area where the wheel is partially unlikely to slip may be selected based on a movement distance (movement area) of the reference position of the vehicle (e.g., the central position of the vehicle or the central position of the rear axles of the vehicle) and the wheel may be switched for each area.

For example, the wheel to be selected may be switched for each area on all the routes by selecting the left front wheel while the movement distance is 1 m to 5 m and selecting the right rear wheel while the subsequent movement distance is 6 m to 10 m.

In Step S9, the control unit 14 controls the movement amount calculator 17 to acquire a wheel speed pulse of the wheel selected in the process of Step S8 (output from the wheel speed sensor 41). The control unit 14 calculates a movement distance of the reference position of the vehicle (e.g., the central position of the vehicle or the central position of the rear axles of the vehicle) based on the acquired data. A result of the calculation is transmitted to the parking controller 15.

In Step S10, the control unit 14 controls the parking controller 15 to execute a vehicle control value calculation process. The vehicle control value calculation process is a process of calculating vehicle control values (control values for steering control, driving control, braking control, etc.) for causing the vehicle M to autonomously travel along the set target parking route.

In Step S11, the control unit 14 executes the automated parking control process for the vehicle M based on the vehicle control values calculated in Step S10. When the parking of the vehicle M at the target parking position is completed, the series of processes is terminated (END).

According to the embodiment described above, the automated parking control device 1 mounted on the vehicle such as an automobile recognizes the surrounding environment and estimates the road surface condition etc. based on the image data that may serve as the surrounding environment information acquired by the camera unit 10 that may serve as the surrounding environment recognition device. The automated parking control device 1 selects the predicted wheel route where the wheel is most unlikely to slip based on the estimated road surface condition, and predicts the movement amount of the vehicle M based on the selected predicted wheel route. Therefore, highly accurate vehicle movement amount information can be acquired, and thus highly accurate vehicle control can be realized.

Although the movement amount of the vehicle is predicted by using the wheel speed pulse during the automated parking control etc., the performance to follow the target parking route does not decrease under a slippery road surface condition such as a snowy road. That is, the number of turning operations and the deviation amount of the final target position can be reduced. Therefore, the quality of the automated parking control etc. can be increased.

The automated parking control is exemplified in the description of the configuration and operations of the automated parking control device of the embodiment described above. The operations of the automated parking control device of this embodiment are not limited to those in the example described above. The control to be executed by using the automated parking control device of this embodiment is also applicable to the assisted parking control for assisting the driver's parking operation.

In the embodiment described above, multiple target parking routes (R1, R2) are generated and displayed. When multiple target parking routes are generated, determination is made to select any one of the target parking routes. For example, when the generated target parking routes are displayed, any one of the target parking routes where the wheel is more unlikely to slip may be displayed as a recommended route in a recognizable format. For example, the recommended route may be colored or displayed in any other visually recognizable format. The driver may manually select a desired target parking route on a display screen that displays the target parking routes. In this case, the driver can easily select the target parking route where the wheel is more unlikely to slip. Alternatively, a predetermined determination criterion may be provided and the control unit 14 may execute automatic selection control in accordance with the determination criterion.

The embodiment of the disclosure is not limited to the embodiment described above, and various modifications and applications may be made without departing from the gist of the disclosure. The embodiment includes various aspects of the disclosure that may be extracted by any appropriate combination of the disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the automated parking control device that can execute accurate automated or assisted parking control under the slippery road surface condition such as a snowy road. This automated parking control device is mounted on the vehicle such as an automobile and executes the traveling control for guiding the vehicle to the available parking area.

The control unit 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit 14 including the parking controller 15, the wheel selector 16, and the movement amount calculator 17. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An automated parking control device configured to execute traveling control for guiding a vehicle to an available parking area, the automated parking control device comprising:
   a surrounding environment recognition device configured to acquire surrounding environment information of the vehicle;
   a parking controller configured to:
      search for the available parking area based on the surrounding environment information acquired by the surrounding environment recognition device;
      generate a target route for movement of the vehicle while the available parking area found by search is set as a destination; and
      execute traveling control for moving the vehicle along the generated target route;
   an image processor configured to estimate a distance to a recognized three-dimensional object and a slippage level of a road surface based on the surrounding environment information acquired by the surrounding environment recognition device;
an image map generator configured to generate a road surface μ map indicating the slippage level of the road surface by image synthesis of information on the distance estimated by the image processor, information on the slippage level of the road surface estimated by the image processor, and the surrounding environment information;
a wheel selector configured to predict passing routes of wheels of the vehicle based on the target route, superimpose the predicted routes of the wheels on the road surface μ map, and select, from among the wheels, one wheel expected to pass through a route where the wheel is most unlikely to slip; and
a movement amount calculator configured to acquire a wheel speed pulse of the selected wheel and calculate a movement amount of a reference position of the vehicle.

2. The automated parking control device according to claim 1, wherein the surrounding environment recognition device is an on-board camera device configured to acquire the surrounding environment information of the vehicle as image data.

3. The automated parking control device according to claim 2, wherein the image processor is configured to estimate the distance to the recognized three-dimensional object and the slippage level of the road surface based on the image data obtained by capturing an image of a predetermined range ahead of the vehicle.

4. The automated parking control device according to claim 2, wherein the image map generator is configured to generate the road surface μ map to be displayed by fusing:
a plane depth map obtained by estimating a depth of the recognized three-dimensional object based on the image data and indicating information on the estimated depth as depth distribution information on a plane image;
a plane μ map obtained by estimating a road surface condition based on the image data and displaying the slippage level of the road surface in a distinguishable format for each predetermined area; and
object recognition data of the recognized three-dimensional object based on the image data.

5. The automated parking control device according to claim 1, wherein the wheel selector is configured to select the one wheel based on overall values of all the routes of each wheel, or select the one wheel expected to pass through an area where the one wheel is unlikely to slip for each area on all the routes.

6. An automated parking control device configured to execute traveling control for guiding a vehicle to an available parking area, the automated parking control device comprising circuitry configured to:
acquire surrounding environment information of the vehicle;
search for the available parking area based on the acquired surrounding environment information, generate a target route for movement of the vehicle while the available parking area found by search is set as a destination, and execute traveling control for moving the vehicle along the generated target route;
estimate a distance to a recognized three-dimensional object and a slippage level of a road surface based on the acquired surrounding environment information;
generate a road surface μ map indicating the slippage level of the road surface by image synthesis of information on the estimated distance, information on the slippage level of the road surface, and the surrounding environment information;
predict passing routes of wheels of the vehicle based on the target route, superimpose the predicted routes of the wheels on the road surface μ map, and select, from among the wheels, one wheel expected to pass through a route where the wheel is most unlikely to slip; and
acquire a wheel speed pulse of the selected wheel and calculate a movement amount of a reference position of the vehicle.

7. The automated parking control device according to claim 1,
wherein the surrounding environment recognition device comprises a visible camera and a near-infrared camera, and
wherein the image processor is further configured to determine the slippage level of the road surface by performing integrated image analysis based on brightness differences in visible images and road-surface condition information obtained from near-infrared sensing.

8. The automated parking control device according to claim 1, wherein the wheel selector is further configured to compare overall values of predicted wheel routes superimposed on the road surface μ map and to select, for each section of the routes, a wheel expected to pass through an area where the wheel is most unlikely to slip.

9. The automated parking control device according to claim 1, wherein the movement amount calculator is further configured to acquire a wheel-speed pulse of the selected wheel and calculate a movement distance of a reference position of the vehicle based on an rotation amount of the wheel, and to estimate a self-position of the vehicle by integrating the calculated movement distance.

10. The automated parking control device according to claim 6, wherein the circuitry is further configured to:
acquire the surrounding environment information from a visible camera and a near-infrared camera; and
determine the slippage level of the road surface by performing integrated image analysis based on brightness differences in visible images and road-surface condition information obtained from near-infrared sensing.

11. The automated parking control device according to claim 6, wherein the circuitry is further is configured to compare overall values of predicted wheel routes superimposed on the road surface μ map and to select, for each section of the routes, a wheel expected to pass through an area where the wheel is most unlikely to slip.

12. The automated parking control device according to claim 6, wherein the circuitry is further configured to acquire a wheel-speed pulse of the selected wheel and calculate a movement distance of a reference position of the vehicle based on an rotation amount of the wheel, and to estimate a self-position of the vehicle by integrating the calculated movement distance.

* * * * *